United States Patent
Somashekar et al.

(10) Patent No.: US 7,206,824 B2
(45) Date of Patent: Apr. 17, 2007

(54) TECHNIQUE FOR CONFIGURING NETWORK DELIVERABLE PLUGGABLE COMPONENTS FOR DEPLOYMENT

(75) Inventors: Parvathi Somashekar, Santa Clara, CA (US); David John Burrowes, Sunnyvale, CA (US); Pierre Delisle, Pacifica, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1211 days.

(21) Appl. No.: 09/733,232

(22) Filed: Dec. 7, 2000

(65) Prior Publication Data

US 2002/0116477 A1 Aug. 22, 2002

Related U.S. Application Data

(60) Provisional application No. 60/169,719, filed on Dec. 8, 1999.

(51) Int. Cl.
*G06F 15/16* (2006.01)

(52) U.S. Cl. .................... 709/220; 709/219

(58) Field of Classification Search ............... 709/220, 709/221, 250, 201, 203, 213, 216, 223–226, 709/208, 237, 317, 320, 328, 225, 219, 228, 709/227; 700/2; 455/442; 718/100; 710/1, 710/8, 301, 302; 717/174
See application file for complete search history.

(56) References Cited

U.S. PATENT DOCUMENTS 5,721,824 A * 2/1998 Taylor ..................... 709/203
5,742,829 A * 4/1998 Davis et al. ............... 717/178
5,802,291 A * 9/1998 Balick et al. .............. 709/202
5,875,327 A * 2/1999 Brandt et al. .............. 713/1
5,903,728 A * 5/1999 Semenzato ................ 709/217

(Continued)

FOREIGN PATENT DOCUMENTS

EP          802 480      10/1997

OTHER PUBLICATIONS

Sommerville and Dean, "PCL: A Configuration Language for Modelling Evolving System Architectures," XP-002152598, 1995, pp. 1-21.
Search Report, PCT/US 00/33430, mailed Jul. 13, 2001.

*Primary Examiner*—Jeffrey Pwu
(74) *Attorney, Agent, or Firm*—Robert C. Kowert; Meyertons, Hood, Kivlin, Kowert & Goetzel, P.C.

(57) ABSTRACT

Embodiments of a Bundle Configuration Utility (BCU) for configuring network deliverable pluggable components for deployment in embedded servers are described. Preferences of a pluggable component may be accessed at runtime on the embedded server. The BCU may enable the configuration of the preferences prior to distribution. The BCU may provide functions including, but not limited to: providing a list of preferences; allowing preference values to be changed; updating the preferences in the pluggable component; creating a new pluggable component with a new set of preferences; and resetting the preferences in the pluggable component to default values. In one embodiment, pluggable components may be configured using a graphical user interface of the BCU. In one embodiment, the BCU may include a command line interface with commands for configuring pluggable components. In one embodiment, multiple pluggable components may be configured by the BCU in batch mode.

54 Claims, 6 Drawing Sheets

U.S. PATENT DOCUMENTS

| | | | |
|---|---|---|---|
| 6,026,437 A * | 2/2000 | Muschett et al. | 709/219 |
| 6,173,438 B1 * | 1/2001 | Kodosky et al. | 717/109 |
| 6,311,165 B1 * | 10/2001 | Coutts et al. | 705/21 |
| 6,366,916 B1 * | 4/2002 | Baer et al. | 707/10 |
| 6,370,436 B1 * | 4/2002 | Howard et al. | 700/2 |
| 6,421,755 B1 * | 7/2002 | Rao | 710/302 |
| 6,560,606 B1 * | 5/2003 | Young | 707/100 |
| 6,611,876 B1 * | 8/2003 | Barrett et al. | 709/246 |
| 6,629,113 B1 * | 9/2003 | Lawrence | 707/206 |
| 6,636,961 B1 * | 10/2003 | Braun et al. | 713/1 |
| 6,637,020 B1 * | 10/2003 | Hammond | 717/107 |
| 6,667,972 B1 * | 12/2003 | Foltan et al. | 370/354 |
| 6,912,580 B1 * | 6/2005 | Kanevsky et al. | 709/228 |

\* cited by examiner

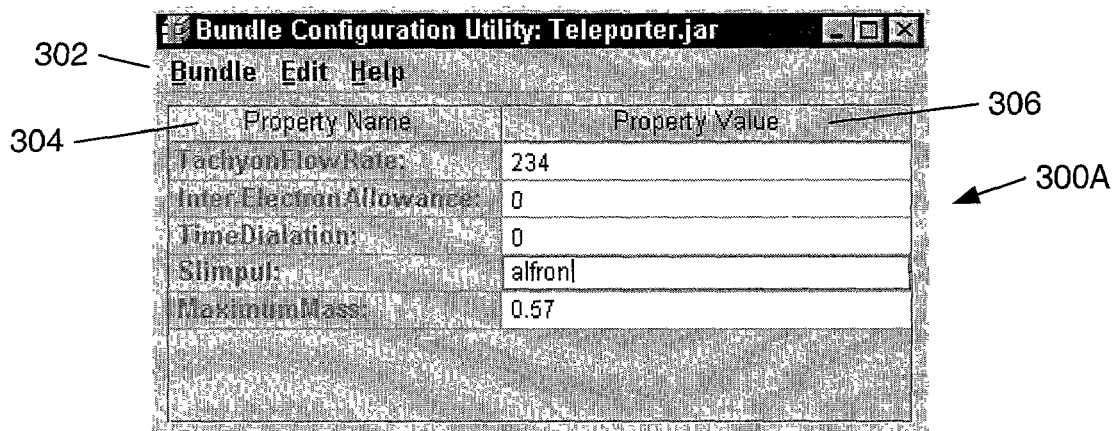
FIG. 4
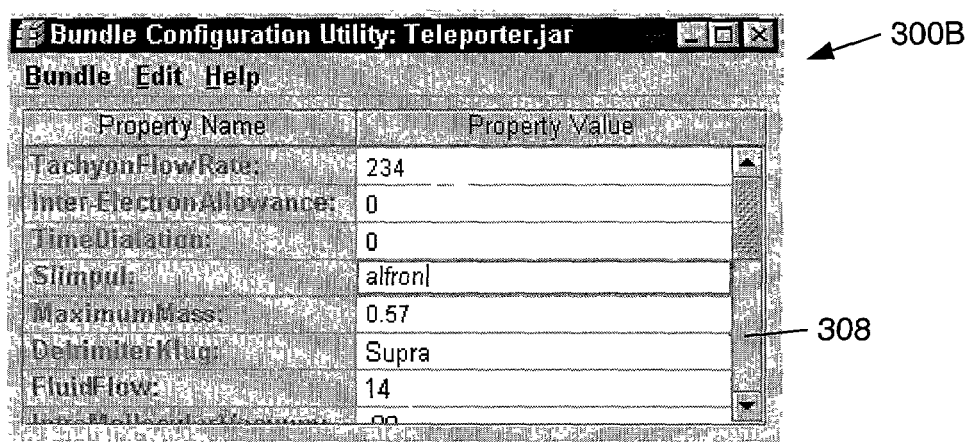
FIG. 5
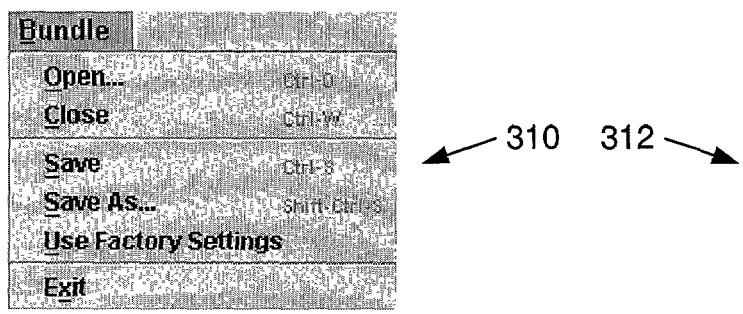 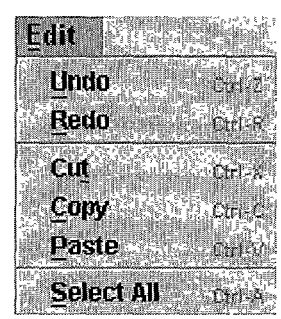
FIG. 6          FIG. 7

TECHNIQUE FOR CONFIGURING NETWORK DELIVERABLE PLUGGABLE COMPONENTS FOR DEPLOYMENT

PRIORITY INFORMATION

This application claims benefit of priority to provisional application Ser. No. 60/169,719 filed Dec. 8, 1999 titled Technique for Configuring Network Deliverable Components, which is hereby incorporated by reference in its entirety.

BACKGROUND OF THE INVENTION

1. Field of the Invention

This invention relates to configuring and distributing software in network environments including Web-centric and Internet-centric environments, and in particular to configuring pluggable components prior to distribution to embedded servers in a network environment.

2. Description of the Related Art

The Internet is growing at an unprecedented rate, and attracting new kinds of users. In the early 1990s, only universities, the government, and some technical professionals had Web access; now consumers, small businesses, and small devices are on the Internet. As more and more people and devices come on-line, opportunities for new applications open up.

While the Internet has grown rapidly into a primary vehicle for quick information, an unexpected side benefit has also emerged—the Internet is the ideal mechanism for enabling, programming, updating, and extending "smart" appliances and devices. For previously "dumb" devices like washers, air-conditioners, and sprinklers, powerful new capabilities are becoming possible using a combination of Internet access, "embedded" microchips, and "smart" software.

Embedded applications run on microcomputers that are embedded within electronic devices such as appliances, vending machines, gasoline pumps, cellular phones, or pagers. Embedded systems are also being used to develop a new line of sophisticated devices such as personal data assistants (PDAs), smart pagers, and Web phones. The latest Web phones now support a variety of useful services, such as an address book, an auto-dialer, an Internet browser, and a calendar. These embedded computers are constrained in terms of space, power, memory, and network connectivity. But in accordance with Moore's law, these constraints have relaxed, and embedded systems have become much more powerful.

Although memory is not quite as scarce as it once was, embedded systems still have limited local memory resources. Only so much space is available for pre-installed services. But if services can be loaded on demand, then a small microprocessor can become a much more versatile computing system. Where once a device could perform only one or two operations, now it can perform a wide variety of operations. This approach to embedded services simplifies management of the devices. The services can be maintained and administered in a centralized location, and can be delivered via the network as required. Users are no longer required to replace the entire device in order to upgrade to new services or capabilities. They simply load a new version of the controlling service.

Embedded server technology has been developed to provide a framework for supporting embedded services. Sun Microsystems' Java Embedded Server™ (JES) is an example of an embedded server framework. FIG. 1 illustrates an example Embedded Server 100 with several network-deliverable services 102 installed including an HTTP protocol service, a logging service, a management service, an SNMP protocol service, and a calendar service.

Embodiments of an embedded server framework may include several components. An embedded server may provide a runtime framework that manages the loading, installation, activation, execution, and removal of one or more services and/or pluggable components. A service may be a specific set of functionality that implements an interface provided by the embedded server. For example, a service could be an application, a specific implementation of a protocol like HTTP or Remote Method Invocation (RMI), or some other set of code intended for a specific purpose, like a logging service. A service may be defined by what it does. A service description may be defined as the name under which a service is registered with the embedded server. Service descriptions allow the embedded server framework to host multiple instances and/or implementations of the same interface. A wizard may be code used by the embedded server framework to correctly manage the life cycle of a service. Life-cycle management may include installing, configuring, activating, updating, deactivating, and uninstalling a service.

In one embodiment, a pluggable component, which may also be referred to as a bundle, may be a container (e.g. Java ARchive (JAR) file) that may include the full set of classes and methods (e.g. Java classes and methods) and/or other resources (e.g. files, data, configuration information including preferences, etc.) needed to implement a service or services (and the set of wizards needed to manage the service) on an embedded server. A pluggable component may include one or more services and sets of wizards. A pluggable component may be narrowly defined and only contain a limited number of files and functionality, or it may be broadly defined to contain much more. The code contained in a pluggable component, when executed, may be thought of as a program or application. The program executes in a component context or bundle context. Each pluggable component in the embedded server may have its own unique component context. This makes it possible for several instances of the same pluggable component to run concurrently within the embedded server, each with its own component context and set of wizards. A manifest may be defined as a file within a pluggable component in which information regarding the pluggable component, for example, configuration information and dependencies on other pluggable components or resources, may be stated.

Services may be installed into an embedded server as part of a pluggable component. However, there is not necessarily a one-to-one correlation between a pluggable component and a service. The code that makes up two or more services can be packaged into one pluggable component and installed into the embedded server.

An embedded server may reside on a device, such as an embedded system, on which installed services are executed, or may reside on a gateway device that serves one or more devices. FIG. 2 illustrates a residential system with a number of devices connected to a gateway device that hosts an embedded server. In this embodiment, the embedded server on the gateway device may receive pluggable components from the network and provide the pluggable components and/or services provided by the pluggable components to one or more of the attached devices. The gateway device may store the pluggable components or may delete the pluggable components when no longer needed. A gateway device may be a standalone device. Alternatively, a device such as a VCR or home computer may serve as a gateway device. The same model as shown in the residential system example of FIG. 2 may be applied to other systems, such as enterprise systems comprising computing devices, printers, PDAs, routers, modems, etc.

Currently, in order to support multiple clients with varied configurations, pluggable components are typically manually configured after deployment, or configured individually (one at a time). In addition, some pluggable components may not be configurable after deployment. Therefore, it is desirable to provide a method for configuring network deliverable pluggable components prior to the components being deployed.

SUMMARY OF THE INVENTION

Embodiments of a Bundle Configuration Utility (BCU) for configuring network deliverable pluggable components, which also may be referred to as bundles, for deployment in embedded servers, are described. In one embodiment, a BCU is a utility that enables the configuration of a set of properties associated with one or more pluggable components prior to distribution. The properties may serve as default values used by the pluggable component when installed into an embedded server. The default values of the properties, accessed from the pluggable component at runtime, may be referred to as preferences of the pluggable component. It is these preferences that the BCU allows a user to configure. Embodiments of a BCU may provide several functions including, but not limited to: providing a list of properties and their values; allowing the value associated with a property name to be changed; updating the configuration information in the source pluggable component; creating a new pluggable component with a new set of configuration information; and resetting the configuration information in the pluggable component to default values.

In one embodiment, a BCU may operate on preferences located within the pluggable component to be configured. In one embodiment, the preferences may be located in a preferences file, which in turn may be located in the pluggable component. Individual preferences may have a (current) value, a class or type and a default value. In configuring the pluggable component, the preferences may be initialized and/or modified prior to deployment to embedded servers. In one embodiment, configuration may be done in a batch mode where several pluggable components are configured during execution of a batch job or batch file. Thus, a BCU may allow for configuring multiple pluggable components substantially simultaneously prior to deployment. After deployment, the pluggable component(s) may have built-in logic that may be configured to read the preference values and establish properties of the component context and/or services provided by the pluggable component in accordance with the preferences. Thus, the necessity of manual configuration of a pluggable component after deployment may be eliminated.

In one embodiment, a user or users of a configuration system (i.e. a system comprising a BCU) may first create and/or compile one or more pluggable components. Alternatively, the pluggable components may have been received from another system or storage device. In one embodiment, pluggable components may be created with preference values initialized to default values. The user may then use the BCU to set and/or modify preference values for one or more of the pluggable components. In one embodiment, a user may invoke the BCU to display preferences from one or more pluggable components, modify one or more values of the displayed preferences, and save the modified pluggable components with the modified preferences. In one embodiment, pluggable components may be bundles such as JAR files, which may include preferences files for storing preference values of the pluggable components. In one embodiment, each pluggable component may include a manifest (e.g. manifest file in the JAR file) that may be used by the BCU to locate one or more preference files in the pluggable component.

In one embodiment, a user may access pluggable components through a graphical user interface (GUI) provided by the BCU. In one embodiment, the BCU may provide a command line interface to allow the user to enter commands for accessing and modifying pluggable components. For example, the configuration system may include an operating system (e.g. Unix, DOS, etc) that provides a command line interface, and the BCU commands may be entered and executed on the configuration system through the provided command line interface. In one embodiment, a user may create a batch file including one or more commands for accessing and modifying one or more pluggable components, and the batch file may be invoked in the command line interface and executed by the BCU to configure the pluggable components specified by the commands in the batch file. Thus, multiple pluggable components may be modified by the BCU in batch mode by executing a pre-created batch file. After creation, compilation and configuration, the pluggable components may be distributed to one or more systems with embedded servers. The pluggable components may then be accessed on the embedded servers to provide one or more services on the embedded server systems.

BRIEF DESCRIPTION OF THE DRAWINGS

FIG. 4 shows an exemplary graphical user interface (GUI) window for a Bundle Configuration Utility (BCU) according to one embodiment;

FIG. 5 shows another exemplary GUI window for a BCU according to one embodiment;

FIG. 6 shows a "Bundle" menu of a BCU according to one embodiment;

FIG. 7 shows an Edit menu of a BCU according to one embodiment;

Figure 1:
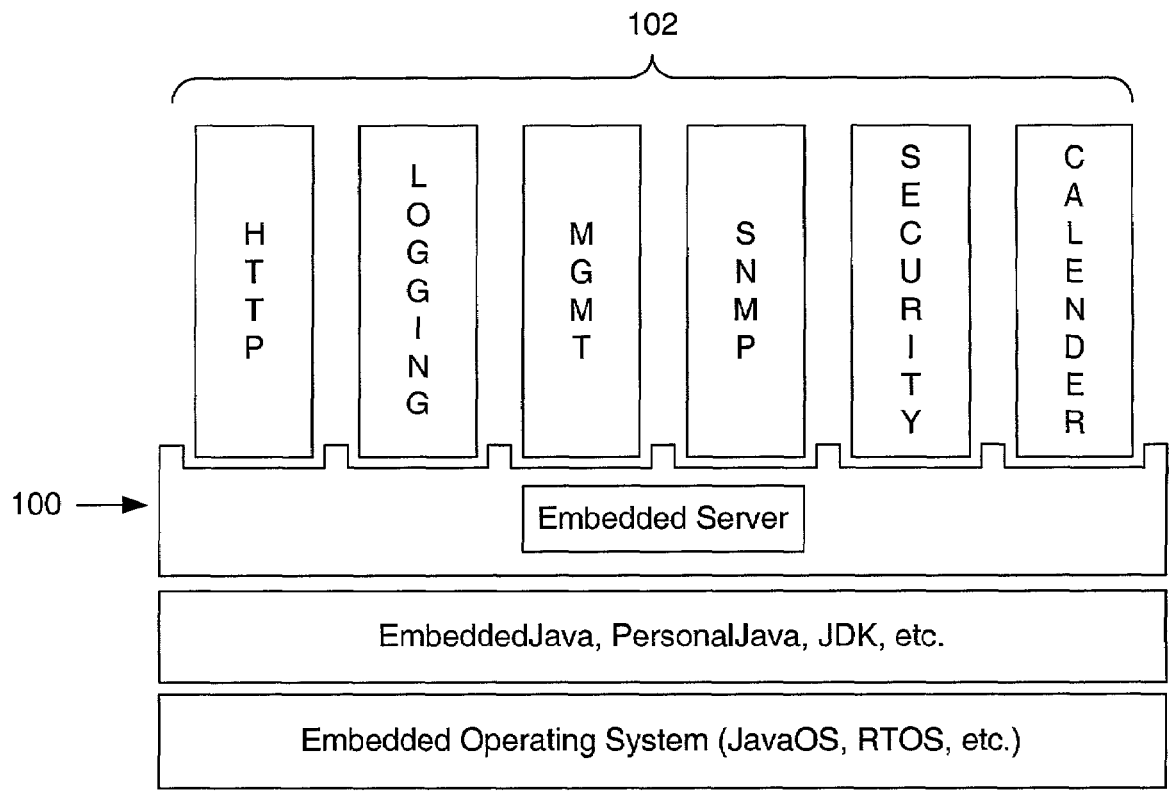
FIG. 1 is an illustration of a conventional embedded server with several embedded services installed.
Figure 2:
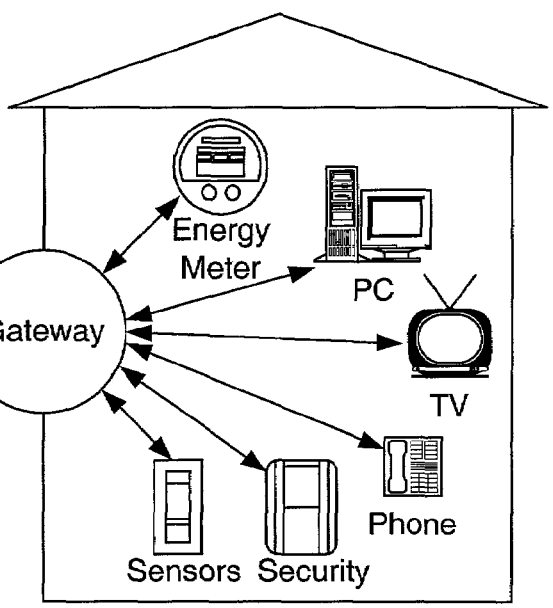
FIG. 2 is an example of a conventional residential gateway system with embedded server.

Item numbers for objects in the Figures may be repeated in more than one Figure to signify objects that are substantially similar in the Figures.

While the invention is susceptible to various modifications and alternative forms, specific embodiments are shown by way of example in the drawings and are herein described in detail. It should be understood however, that the drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF SEVERAL EMBODIMENTS

Embodiments of a Bundle Configuration Utility (BCU) for configuring network deliverable pluggable components for deployment in embedded servers are described. A BCU is a utility to allow the change (configuration) of a set of properties associated with a pluggable component. The properties may serve as default values used by the pluggable component when installed in an embedded server. Properties associated with the pluggable component are called preferences in this document to distinguish them from the properties of the component context and/or services that exist at run-time.

In one embodiment, a BCU may operate on configuration information (e.g. preferences) located within the pluggable component to be configured. In one embodiment, the configuration information may be located in a configuration file (also referred to as a preferences file). In one embodiment, the configuration information may be comprised in a standard java.lang.Properties file. Individual preferences may have a value, a class and a default value. In configuring the pluggable component, the configuration information may be initialized and/or modified before deployment. In one embodiment, configuration may be done in a batch mode where several such pluggable components are configured during execution of the batch file. Thus, a BCU may allow for configuring multiple pluggable components substantially simultaneously. After being deployed, the pluggable component may have built-in logic that may be configured to read the configuration information and establish properties of the component context and/or services provided by the pluggable component in accordance with the configuration information. Thus, the necessity of manual configuration of a pluggable component after deployment may be eliminated.

Figure 3:
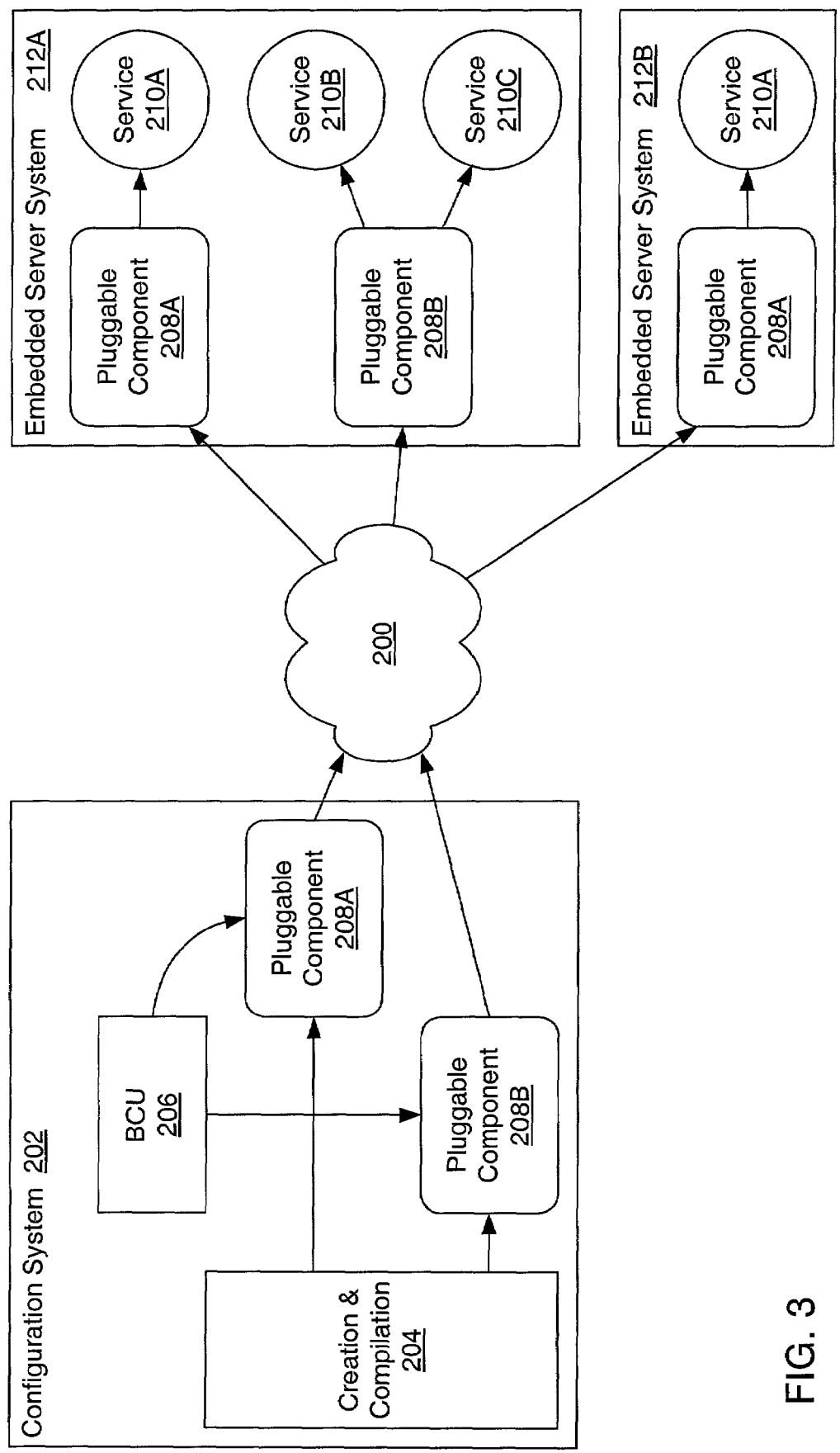
FIG. 3 illustrates an exemplary pluggable component configuration and distribution system according to one embodiment.

FIG. 3 illustrates an exemplary pluggable component configuration and distribution system according to one embodiment. In this embodiment, the system may comprise at least one configuration system 202 and one or more embedded server systems 212. In this example, two embedded server systems, 212A and 212B, are connectable to configuration system 202 via a network 200. Configuration system 202 is preferably a computer system and may include various standard components, including one or more processors or CPUs, a memory medium, one or more buses, one or more network ports for connecting to and communicating over networks such as network 200, etc. Embedded server systems 212A and 212B may be any of various types of devices, including a computer system, Internet appliance, information appliance, personal digital assistant (PDA), television (e.g., digital television), set top box or cable modem, gateway device, home appliances (e.g. refrigerators, microwaves, etc.) with embedded systems or other similar devices. Each of embedded server systems 212A and 212B may comprise standard computer components, such as a processor or CPU, memory medium, and/or display, one or more network ports for connecting to and communicating over networks such as network 200, etc. The network 200 may be any of various types or combinations of local area network and/or wide area network, including the Internet.

The term "computer system" as used herein may generally describe the hardware and software components that in combination allow the execution of computer programs. The computer programs may be implemented in software, hardware, or a combination of software and hardware. A computer system's hardware generally includes a processor, memory medium, and input/output (I/O) devices. A computer system may take various forms, including a personal computer system, mainframe computer system, workstation, network appliance, Internet appliance, information appliance, personal digital assistant (PDA), television system, home appliance with embedded systems or other device. In general, the term "computer system" may be broadly defined to encompass any device having a processor that executes instructions from a memory medium.

As used herein, the term "processor" generally describes the logic circuitry that responds to and processes the basic instructions that operate a computer system. The term "memory medium" includes various types of memory including an installation medium, e.g., a CD-ROM, or floppy disks; a volatile computer system memory such as DRAM, SRAM, EDO RAM, Rambus RAM, DDR SDRAM, etc.; or a non-volatile memory such as optical storage or a magnetic medium, e.g., a hard drive. The term "memory" is used synonymously with "memory medium" herein. The memory medium may comprise other types of memory or combinations thereof. In addition, the memory medium may be located in a first computer in which the programs are executed, or may be located in a second computer that connects to the first computer over a network. In the latter instance, the second computer provides the program instructions to the first computer for execution.

The memory medium comprised in the configuration system 202 preferably stores a software program or programs for enabling configuration system 202 to set and/or modify the preferences of pluggable components 208 and to distribute the pluggable components 208 to embedded server systems 212A and 212B. In one embodiment, configuration system 202 may also store a software program or programs for creating and/or compiling pluggable components 208 prior to setting and/or modifying the preferences of the pluggable components 208. The memory medium comprised in the embedded server systems 212A and 212B may include software for enabling the systems 212A and 212B to execute pluggable components 208 and thus to provide services 210 on systems 212A and 212B. In one embodiment, the embedded server systems 212A and 212B may include embedded servers for executing pluggable components 208. In one embodiment, the embedded servers may be Java Embedded Servers (JES). The software program(s) may be implemented in any of various ways, including procedure-based techniques, component-based techniques, and/or object-oriented techniques, among others. For example, the software program may be implemented using ActiveX controls, C++ objects, Java, JavaBeans, Microsoft Foundation Classes (MFC), or other technologies or methodologies, as desired. A CPU executing code and data from a memory medium includes a means for creating and executing the software program or programs according to the methods, flowcharts, and/or block diagrams described below.

In FIG. 3, a user of configuration system 202 may first create and/or compile one or more pluggable components 208. Alternatively, the pluggable components may have been received on configuration system 202 from another system or storage device. For example, the pluggable components may have been created and/or compiled on one or more other systems and delivered (e.g. via the network 200) to configuration system 202. In one embodiment, pluggable components may be created with preference values initialized to default values.

Configuration system 202 may include a bundle configuration utility (BCU) 206 which may be used to set and/or modify preference values in pluggable components 208A and 208B. In one embodiment, a user of configuration system 202 may execute BCU 206 to display preferences from one or more pluggable components 208, modify one or more values of the displayed preferences, and save the modified pluggable components. In one embodiment, pluggable components 208 may be bundles such as JAR files, and may include preferences files for storing preference values for the pluggable components 208. In one embodiment, each pluggable component may include a manifest (e.g. manifest file in the JAR file) that may be used by BCU 206 to locate one or more preference files in the pluggable component 208.

In one embodiment, a user may access pluggable components 208 through a graphical user interface (GUI) provided by BCU 206. In one embodiment, BCU 206 may provide a command line interface to allow the user to enter commands for accessing and modifying pluggable components 208. For example, configuration system 202 may include an operating system (e.g. Unix, DOS, etc) that provides a command line interface, and the BCU commands may be entered and executed on the configuration system 202 through the provided command line interface. In one embodiment, a user may create a batch file including one or more commands for accessing and modifying one or more pluggable components 208, and the batch file may be invoked in the command line interface and executed by the BCU 206 to modify the pluggable components 208 specified by the commands in the batch file. Thus, multiple pluggable components may be modified by the BCU 206 in batch mode by executing a pre-created batch file. Batch files may be stored (e.g. on the configuration system 202) and later accessed and modified and/or executed to access and modify the same set or another set of pluggable components.

After creation, compilation and configuration by BCU 206, the pluggable components 208 may be distributed to one or more systems with embedded server systems 212. In one embodiment, commands entered on a command line interface may be used to distribute one or more pluggable components 208 to one or more embedded server systems 212. In one embodiment, a batch file may be created with one or more commands for distributing pluggable components 208. A command to distribute one or more pluggable components 208 to one or more embedded server systems 212 may include identification information (e.g. name, directory path, etc) for the pluggable component(s) 208 to be distributed and location information (e.g. network address, URL, etc) of the one or more embedded server systems 212. In one embodiment, a graphical user interface may be provided for distributing pluggable components 208. In other embodiments, other methods of distributing pluggable components 208 may be utilized. For example, in one embodiment, a pluggable component 208 may be copied to a portable magnetic medium (e.g. floppy disk, Zip disk, CD-ROM or other distributable medium) and physically distributed to the embedded server system(s) 212.

In the example illustrated in FIG. 3, pluggable component 208A has been delivered to embedded server systems 212A and 212B, while pluggable component 208B has been delivered to embedded server system 212A. The pluggable components may be accessed to provide one or more services 210 on the embedded server systems 212. In this example, portions of pluggable component 208A may be executed to provide service 210A on embedded server systems 212A and 212B. A first portion of pluggable component 208B may be executed on embedded server system 212A to provide service 210B, and a second portion of pluggable component 208B may be executed on embedded server system 212A to provide service 210C.

Embodiments of a BCU 206 may provide several functions including, but not limited to:

Providing a list of properties and their values.

Allowing the value associated with a property name to be changed/edited

Updating the configuration information in the source pluggable component 208.

Creating a new pluggable component 208 with a new set of configuration information in it.

Resetting the configuration information in the pluggable component 208 to factory default values.

As mentioned, in one embodiment, a BCU operates on a preferences file (e.g. standard java.lang.Properties file) located with in the pluggable component 208 to be configured. In one embodiment, a preferences file may be created at development time, and may include entries for each configurable preference. In one embodiment, information that directs the BCU 206 where to find the preferences file in the pluggable component 208 may be included in the pluggable component. In one embodiment, this information may be included in a manifest file of the pluggable component. In one embodiment, if there is no preferences file or manifest entry for the preferences file, the BCU 206 may not be able to locate and alter the pluggable component, and may report an error or otherwise indicate the problem. In one embodiment, an entry in the manifest file may be similar to the following exemplary entry:

BundlePreferences: some/directory/foo.properties

In one embodiment, the entry may include a path referring to a file within the pluggable component 208, relative to a root of the pluggable component, rather than being a general URL to some resource.

In one embodiment, BCU 206 may allow a user to alter the values for any of the included preferences, but not allow the creation or deletion of preferences in the preferences file. In one embodiment, preferences may only be created or deleted at development time. Individual preferences may have a value, a class, and a default value. In one embodiment, BCU 206 may allow the user to alter only the value of a preference. In one embodiment, entered preference values are validated, e.g. by type checking, by the BCU 206.

In one embodiment, all preferences in a preferences file may be initialized to default values before installation (e.g. during compilation), and modified to other values through use of the BCU 206 before installation, if desired. Thus, otherwise identical pluggable components may be configured for use in different execution environments by modification of the preference values. In one embodiment, properties that should not be accessible to customizers of the pluggable component 208 after installation are not included in the preferences file. In one embodiment, a pluggable component 208 may be installed in an embedded server system 212 without being configured with a BCU 206. For example, a pluggable component 208 may be installed with default values as assigned during compilation on an embedded server system 212 that does not require customization of preference values.

In one embodiment, when a pluggable component 208 is installed in an embedded server system 212, an interested party (e.g. activator wizard, configuration bean or service) may locate the preferences file in the pluggable component 208 (e.g. through the manifest) and extract any values of interest. In one embodiment, an interested party may not be allowed to modify the preference values in a pluggable component 208 after the pluggable component 208 is installed in an embedded server system 212. In another embodiment, an interested party may be allowed to modify at least some of the preference values in a pluggable component 208 after the pluggable component 208 is installed in an embedded server system 212. In one embodiment, a pluggable component 208 may be customizable in regards to modification access for the preference values in the component after installation in an embedded server system 212, thus allowing varying degrees of modification access (e.g. no preferences may be modified, some preferences may be modified, all preferences may be modified, etc.) depending on the requirements of the installation.

In one embodiment, a BCU 206's actions may be constrained so that it does not allow a user to perform actions on a preferences file and/or pluggable component 208 that may make a pluggable component 208 "invalid", such as removing necessary files. In one embodiment, it may be possible for a user of a BCU 206 to specify a value that is out of range or otherwise invalid in the preferences file. In such cases, after installation, the consumer of the file may use the default value for the property and report an error.

In one embodiment, the preferences file may be in the format delivered by the java class java.lang.Properties. In one embodiment, for each preference in the file, there may be up to three properties of the preference specified: the current value, the class of the preference, and a default value. For the exemplary preference "myPref", examples of all three properties of the preference are:

| | |
|---|---|
| myPref = 12345 | (the value) |
| myPref.class = java.lang.Integer | (the class) |
| myPref.default = 0 | (the default value) |

Rules for preferences in preferences files may include, but are not limited to, the following:

Omissions:

If the current value property is omitted, the default value may be used.

If the class is omitted, a default class (e.g. java.lang.String) may be assumed.

If the default is omitted, 0, false, "", NULL or other value may be used, as appropriate for the type of preference.

Class names should be fully qualified.

Preference names should not contain a "." character.

Preference names may not end in ".class" or ".default" to insure forward compatibility.

BCU may not preserve comments or order of the properties in the file.

The GUI may verify all values and defaults are acceptable (valid) when it opens the pluggable component.

The GUI may validate only the preferences it is told to read or modify.

Errors:

If the class is no one of an allowed set of classes, BCU may report an error. For example, the following are examples of classes that may be allowed in a Java implementation:

java.lang.String java.lang.Integer java.lang.Boolean java.lang.Long java.lang.Short ???.???.IPAddress If the value cannot be coerced to the class, then an error may be reported.

Embodiments of a BCU 206 may include a command line interface, a Graphical User Interface (GUI), or both forms of interfaces in the same executable. One embodiment of a BCU 206 may allow for configuring multiple pluggable components 28 substantially simultaneously. One embodiment of a BCU 206 may provide standard edit features such as Copy/Paste and Undo/Redo. In one embodiment, multiple pluggable components may be configured using scripts (batch files) that can call BCU commands in the command line. After configuring a pluggable component 208 using BCU 206, it may be ready for deployment as a pluggable unit on the network, for example, on an embedded server, where the services provided by the pluggable component 208 can read and initialize from the new preferences file.

FIG. 4 illustrates a GUI window 300A for a BCU 206 according to one embodiment. Window 300 in FIG. 4 displays an exemplary list of preferences for a pluggable component. The list of preferences includes a name 304 for each property of the pluggable component 208 in the preferences and a corresponding preference value 306 for each property 304. The GUI window 300A may also include one or more menus 302 for accessing various functions of the BCU 206. In one embodiment, BCU 206 may support multiple GUI windows 300 open at one time, with each displaying a set of preferences for a different pluggable component 208. In one embodiment, BCU 206 may be terminated by closing all currently open GUI windows 300. In one embodiment, the name fields 304 may not be selected or edited in the BCU 206. Individual preference values may be displayed in "cells". In one embodiment, keyboard vertical arrow keys, return and shift return may move the focus to the next or previous cell, vertically. In one embodiment, a cursor control device such as a mouse may be used to select a cell. In one embodiment, the tab key may transfer keyboard focus to a next component.

In one embodiment all fields (i.e. cells) have at least two visible states. A first visible state is when there is no keyboard focus in a cell, the second when focus is in the cell. In one embodiment, text and number fields may allow a user to select a range of text. Thus, when keyboard focus is transferred into the cell (using the arrow or enter keys or alternatively a cursor control device such as a mouse), the contents may be initially fully selected. In one embodiment, horizontal arrow keys may be used to affect the placement of the insertion point and selection in the text fields. In one embodiment, a Boolean field (such as a checkbox) may be toggled with keyboard action. For example, in one embodiment, the space bar may be used to toggle the state of a Boolean field. In one embodiment, typing an invalid character in a field that performs input validation may not affect any currently selected text.

FIG. 5 illustrates a GUI window 300B for a BCU 206 according to one embodiment. In GUI window 300B, the list of preferences includes more properties, and all are not displayable within the physical limits of window 300B.

Window 300B includes a scrollbar 308 for accessing properties and their associated values that are not currently visible in window 300B.

FIG. 6 illustrates a "Bundle" menu 310 accessible in BCU 206 according to one embodiment. Menu 310 may include one or more menu commands such as commands for opening, closing, and saving preferences of pluggable components 308. An "Open" command may be used to open a first pluggable component and display its preferences in a GUI window 300 such as those illustrated in FIGS. 4 and 5. In one embodiment, selecting the "Open" menu command may result in an "Open" dialog being displayed, in which zero or more pluggable components 208 may be listed. The user may then select one or more of the pluggable components 208 to be opened. If a pluggable component's preferences are already displayed in a GUI window 300, the "Open" command may be used to open one or more additional pluggable components 208 and display its preferences in additional GUI windows 300, with the preferences for one pluggable component 208 displayed in one GUI window 300. In one embodiment, pluggable components 208 currently opened in the BCU 206 may be excluded from an Open dialog displayed in response to the "Open" menu command. In another embodiment, choosing an already opened bundle in the Open dialog may bring its GUI window 300 to the front.

The "Close" command of menu 310 may be used to close a currently open GUI window 300. In one embodiment, if the window displays preferences for a pluggable component 208, and if any of the preferences have been modified, the BCU 206 may prompt the user to save the changes, cancel the changes, and/or cancel the close operation. The "Save" command of menu 310 may be used to save any preferences for a pluggable component 208 displayed in the GUI window 300 that have been modified since the last time the pluggable component 208 was opened or saved. The "Save As" command of menu 310 may be used to save the currently open pluggable component 208 displayed in the GUI window 300 into a new pluggable component 208, and may allow the user to enter a new name for the new pluggable component 208. In one embodiment, the "Save As" menu command may result in a "Save As" dialog being displayed, in which the user may enter a new name and/or a new location for the pluggable component 208. Any modifications to the preferences that have been made in the GUI window 300 may be saved to the new pluggable component. The "Use Factory Settings" command of menu 310 may be used to reset all preference values in the currently open pluggable component 208 to their default values. In one embodiment, a pluggable component 208 may maintain two values for each property: a current value and a default (factory) value. The user can choose the "Exit" command of menu 310 to close all currently open GUI windows 300 and to exit the BCU 206. In one embodiment, if there are any unsaved changes, the user may be prompted to save the changes before exiting the BCU 206, or to cancel the Close operation.

In one embodiment, the "Open", "Close", "Save" and "Save As" commands may be constrained to working with files of a particular type or types. In one embodiment, pluggable components are Java ARchive (JAR) files, and the commands may be constrained to working with JAR files. In one embodiment, JAR files may be identified by a ".jar" file extension.

FIG. 7 illustrates an Edit menu 312 that may be accessed from the BCU 206 according to one embodiment. The Edit menu 312 may include several menu commands for use in editing preference values currently displayed in a GUI window 300, such as "Undo" and "Redo" commands for undoing a previous edit action and redoing a previously undone edit action respectively. Edit menu 312 may also include "Cut", "Copy", and "Paste" commands for using the clipboard for cutting, copying and pasting portions of displayed preference values. Edit menu 312 may also include a "Select All" command for selecting all of a currently active preference value, or alternatively for selecting all preference values in the currently open pluggable component 206.

In one embodiment, the Undo command undoes the last change to the preference values in the window 300. In one embodiment, the undo is performed at a "field level" granularity, that is, it does not undo individual key presses, but instead undoes changes to the most recently changed field. In one embodiment, if the user has started to change a value, the undo returns the pre-altered version of the value. In one embodiment, if the user switches focus to another field and chooses Undo, the contents of the previously visited field are undone. In one embodiment, Undo operations (and the corresponding Redos) may also move the insertion point (i.e. focus) to the position they were before the last action was made. In one embodiment, Undo may be performed past the last save back to the start of the current session.

One embodiment of a BCU 206 may also include "Help" and "About" menu options.

Command Line Interface

Some embodiments of a BCU 206 may also include a command line interface that may be used to enter and execute commands to perform various actions of the BCU 206. In one embodiment, a configuration system on which the BCU 206 resides may provide a command line window (e.g. Unix, DOS, etc.), in which the BCU commands may be entered and executed. In one embodiment, the BCU 206 command-line interface may be used to perform various actions including, but not limited to:

listing the properties of specified bundles updating the values of the properties of a bundle updating the values of properties and create a new version of the bundle that contains the updated property values running the BCU graphical user interface The following are examples of formats and content for command line interface commands according to one embodiment. The formatting of these commands is for exemplary purposes and is not intended to be limiting. Other command formats, command names, etc., may be used in other embodiments.

```
bcu about
bcu help
bcu list <bundle-file>...
bcu useFactorySettings <bundle-file>...
bcu update [--output <bundle-file>] --properties <key-value-set> <bundle-file>
bcu usegui <bundle-file>...
```

The following is an example format for a BCU 206 command line:

```
bcu [--dryrun] [{-j, --jvmarg} <vm-options>] <subcommand>
```

The options of a BCU 206 command line may include, but are not limited to, the following:

--dryrun

Displays the command line that a startup script will invoke. This option is processed by the startup script.

```
-j <vm-options>
--jvmarg <vm-options>
```

May be used to set options that will be passed to the Java Virtual Machine (VM). This is a collection option, and is processed by the startup script.

Subcommands may include, but are not limited to:

about

The about command returns information about the BCU 206, such as its version number. For example:
>bcu about
Name: Bundle Configuration Utility
Version: 1.2.0 help

The help command may display help information describing how to use a BCU command line command. If no command is specified, a command-line synopsis and a full description of all command options and subcommands may be displayed. If a subcommand is specified, prints information for that subcommand only. For example:
>bcu help NAME
bcu—enables the change of the values of a set of properties associated with a bundle before that bundle is installed into an embedded server.

list <bundle-file> . . .

Lists the properties and their values in the specified bundles (i.e. pluggable components). It may report a multicolumn "table" to standard out. In one embodiment, the widths of the columns may be adjusted to accommodate the widest value in them with space characters separating each. In one embodiment, the values may be sorted ascending by the preference name. The following is an example of using the list command according to one embodiment:
>bcu list myBundle.jar
Properties for myBundle.jar

| Property Name | Property Value |
| --- | --- |
| Inter-ElectronAllowance | 0 |
| MaximumMass | 0.5 |
| Slimpul | alfron |
| TachyonFlowRate | 234 |

TimeDialation 0 update {-p,--properties}<property-list>[{-o,--output}<filename>]|<bundle-file>

Changes the value of the specified properties in the specified bundle. If "--output" is included, the revised bundle may be written to the output file and the original will remain unchanged. In one embodiment, the --properties option is a collection option and follows the standard rules for collection options. In one embodiment, the update command may follow the rules for key:value pairs. In one embodiment, if one or more of the preference names does not exist in the bundle, or the specified value cannot be cast to the declared type, the bundle may not be altered in any way and a non-zero status code may be returned. In one embodiment, if the --output option is not specified the original bundle will be updated. However, if it is specified, then the argument may be treated as a pathname and an updated copy of the source bundle may be written there. The following example command will change the values of the "accessTime" and the "accessSpeed" properties in the "myBundle" pluggable component:
bcu update -p accessTime:12,accessSpeed:56K . . . /bundles/myBundle.jar An example that will update the values for "Slimpul" and "MaximumMass" in myBundle.jar:
>bcu update --properties "Slimpul:gliblul MaximumMass:45" myBundle.jar useFactorySettings <bundle-file> . . .

useFactorySettings may reset the properties in all the specified bundles to their default settings. For example:
>bcu useFactorySettings myBundle.jar usegui <bundle-file> . . .

Starts the graphical interface for the BCU 206, optionally specifying one or more bundle files that BCU 206 will open in their own windows 300 in the BCU 206 GUI. In one embodiment, if the command line's syntax is correct, then it will return a status code of 0 (that is, errors that occur in the GUI will not be reflected in command line shell).

Error Reporting

The following table lists error codes that the BCU 206 may report in either the command line interface or the GUI. Note that some codes may be used for multiple error conditions. The codes are used for exemplary purposes only, and are not intended to be limiting. The error codes may include, but are not limited to:

| Category | Code | Details |
| --- | --- | --- |
| Success | | |
| | 0 | BCU completed with no errors or warnings |
| Errors | | |
| | 1 | general error |
| | 2 | an invalid option was found |
| | 3 | invalid subcommand found |
| | 4 | an argument was missing |
| | 6 | invalid data type passed as an argument |
| | 7 | no operands provided |
| | 8 | no parameters were listed |
| | 9 | no subcommands were found |
| | 10 | a semantically invalid argument was passed to an option. |
| | 11 | an invalid key was used |
| | 12 | an invalid help topic was requested |
| | 13 | an invalid option was found |
| | 14 | tried to remove a value from the property collection |
| | 15 | an attempt to treat a non-collection option as a collection option was made |
| | 16 | extra parameters found on the command line |
| | 42 | an invalid bundle was encountered |
| | 43 | no properties were found in the preferences file |
| | 44 | too many bundles were passed to "update" |

-continued

| Category | Code | Details |
|---|---|---|
| | 45 | an invalid key was encountered |
| | 52 | the bundle was not found |
| | 53 | no manifest was found |
| | 54 | no preferences entry found in the manifest |
| | 55 | no preferences file was found |
| | 56 | could not update the bundle |
| Warnings | | |
| | 101 | general warning |
| Internal Errors | | |
| | 127 | internal error |

Figure 8:
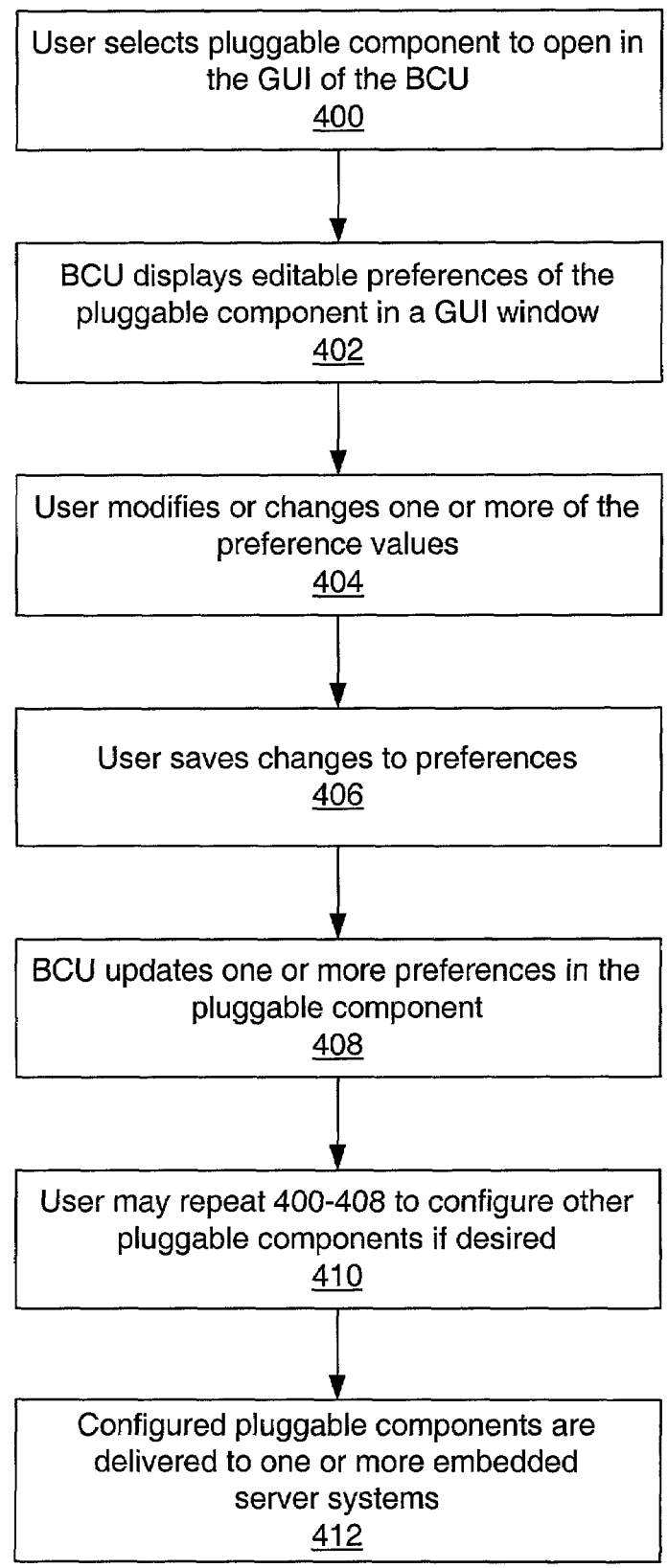
FIG. 8 is a flowchart of a method for configuring pluggable components using a GUI to the BCU according to one embodiment.
Figure 9:
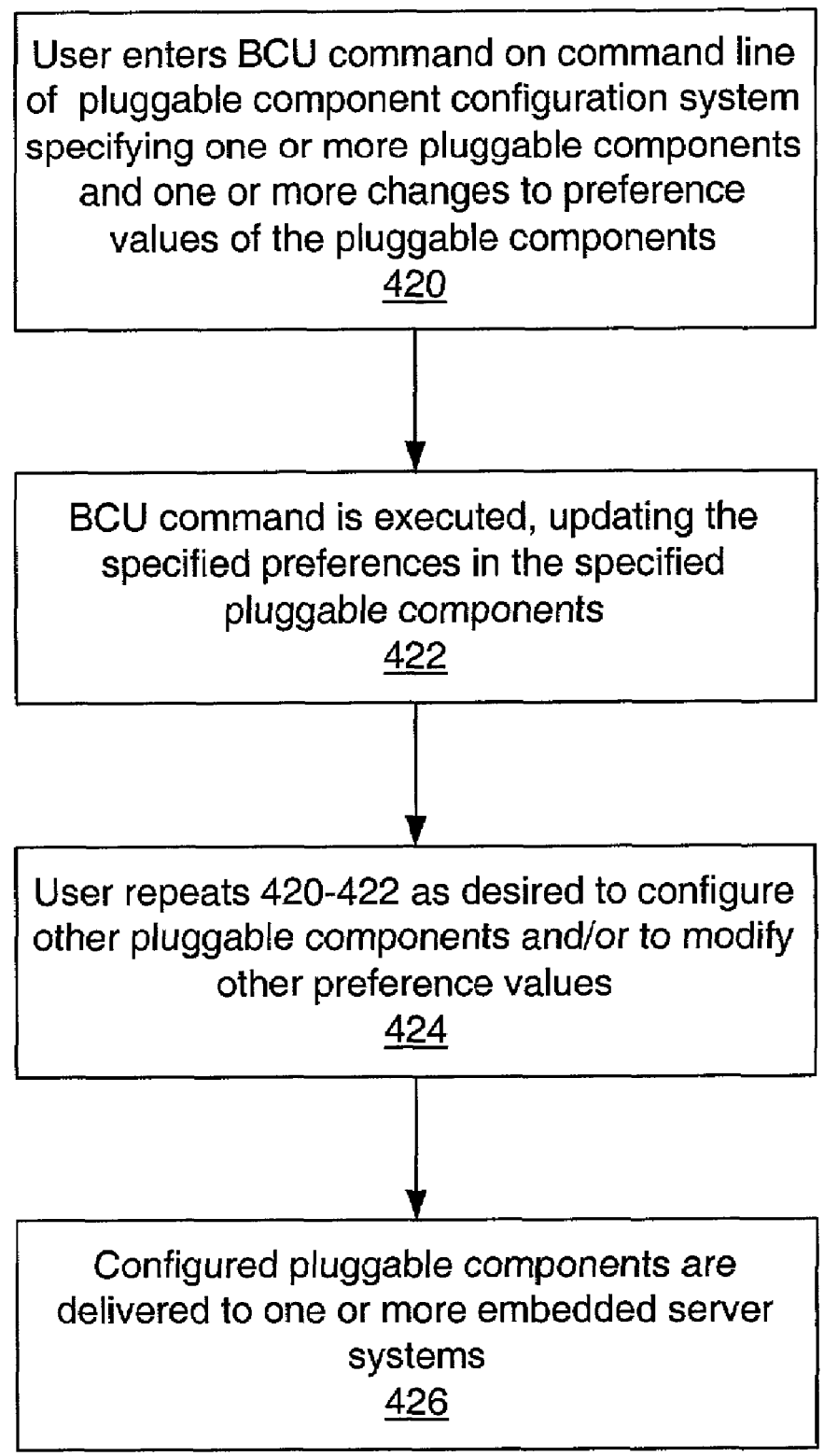
FIG. 9 is a flowchart of a method for configuring pluggable components using a command line interface to the BCU according to one embodiment.
Figure 10:
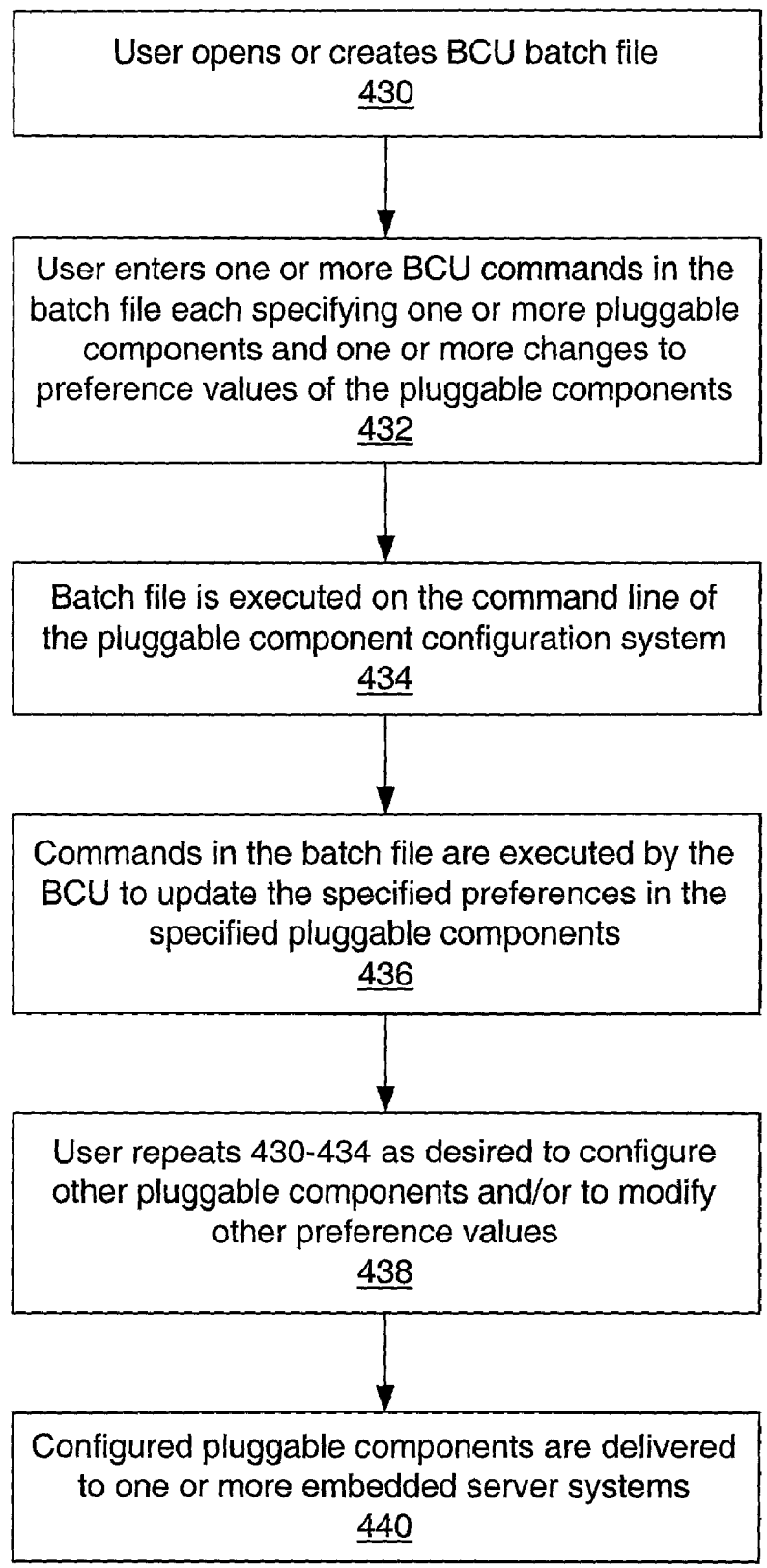
FIG. 10 is a flowchart of a method for configuring pluggable components using a batch file containing BCU commands and executed from a command line according to one embodiment.

FIGS. 8–10 are flowcharts illustrating several embodiments of methods for configuring pluggable components 208 using a BCU 206. FIG. 8 illustrates a method for configuring pluggable components using a graphical user interface (GUI) to the BCU 206 according to one embodiment. FIG. 9 illustrates a method for configuring pluggable components using a command line interface to the BCU according to one embodiment. FIG. 10 illustrates a method for configuring pluggable components using a batch file containing BCU commands and executed from a command line. Various embodiments of a BCU 206 may provide one or more of these methods.

In FIG. 8, a user may select a pluggable component 208 to be configured from the GUI of the BCU 206, as indicated at 400. In one embodiment, the GUI may have been invoked from the command line using a BCU command (e.g. "usegui" as described above). In one embodiment, the user may specify the pluggable component 208 to be configured in the GUI in the command line that invokes the BCU 206. In one embodiment, the user may select an "Open" menu command to bring up a file open dialog from the GUI window, and select the pluggable component 208 to be configured from the file open dialog.

The BCU 206 may display the editable preferences of the pluggable component 208 selected in 400 in a GUI window 300, as indicated at 402. In one embodiment, the preferences may be displayed substantially similarly to the example GUI windows 300A and 300B as illustrated in FIGS. 4 and 5, respectively. The user may then modify or change one or more of the preference values displayed in the GUI window, as indicated at 404. In one embodiment, the user may use methods of editing the preference values similar to those described above for FIG. 4. In 406, the user may then save the modified preferences to the pluggable component 208. In one embodiment, the user may select one of one or more menu functions for saving the modified preferences to the currently open pluggable component 208 or for saving the modified preferences to a new pluggable component 208. In one embodiment, the user may use a menu command to make a copy of the original pluggable component, with the newly configured preference values saved to the new pluggable component 208. In one embodiment, the user may close the currently opened GUI window 300 (e.g. using a menu command or close box on the window) and be prompted to save the modified preference values to the pluggable component 208. In 408, the BCU updates the one or more modified preference values in the pluggable component 208 in response to the save initiated by the user in 406.

If desired, the user may repeat 400–408 for one or more pluggable components 208 as indicated at 410. Thus, the user may use the GUI to configure a plurality of pluggable components 208 prior to distributing the components to embedded server systems 212. In 412, the configured pluggable component(s) 208 may be delivered to one or more embedded server systems 212. In one embodiment, the pluggable components 208 may be delivered to embedded server systems 212 from the configuration system 202 via a network (e.g. the Internet).

In FIG. 9, a user may enter a BCU command as described above to a BCU command line interface on a pluggable component configuration system specifying one or more pluggable components 208 and one or more changes to preference values of the pluggable components 208, as indicated at 420. The entered BCU command is executed, updating the specified preferences in the specified pluggable components 208, as indicated at 422.

If desired, the user may repeat 420–422 for one or more pluggable components 208, as indicated at 424. Thus, the user may use the command line interface to configure a plurality of pluggable components 208 prior to distributing the components to embedded server systems 212. In 426, the configured pluggable component(s) 208 may be delivered to one or more embedded server systems 212. In one embodiment, the pluggable components 208 may be delivered to embedded server systems 212 from the configuration system 202 via a network (e.g. the Internet).

In FIG. 10, a user may create and/or open a previously existing batch file, as indicated at 430. In 432, the user may enter one or more BCU commands as described above in the batch file, with each command specifying one or more pluggable components and one or more changes to the preference values of the specified pluggable components 432. The batch file may then be executed from the command line interface of the pluggable component configuration system, as indicated at 434. The execution of the one or more commands in the batch file by the BCU may update the specified preferences in the specified pluggable components as indicated at 436.

If desired, the user may repeat 430–434 for one or more batch files, as indicated at 438. Thus, the user may use batch files to configure a plurality of pluggable components 208 prior to distributing the components to embedded server systems 212. In 440, the configured pluggable component(s) 208 may be delivered to one or more embedded server systems 212. In one embodiment, the pluggable components 208 may be delivered to embedded server systems 212 from the configuration system 202 via a network (e.g. the Internet).

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Various modifications and changes may be made as would be obvious to a person skilled in the art having the benefit of this disclosure. It is intended that the invention embraces all such modifications and changes and, accordingly, the specifications, appendices and drawings are to be regarded in an illustrative rather than a restrictive sense.

What is claimed is:

1. A method for configuring pluggable components, the method comprising:
configuring preference values for one or more pluggable components on a first device; and
distributing the one or more pluggable components to one or more other devices via a network subsequent to said configuring;
wherein the one or more pluggable components are executable within the one or more other devices in accordance with the configured preference values to provide services to users of the one or more other devices.

2. The method as recited in claim 1, wherein said configuring preference values for one or more pluggable components on a first device comprises:
receiving user input to a graphical user interface of the first device; and
modifying the preference values of a first of the one or more pluggable components in accordance with the received user input.

3. The method as recited in claim 2, further comprising displaying on the graphical user interface a current value of each of the preference values of the first pluggable component, wherein the received user input changes one or more of the displayed current values.

4. The method as recited in claim 2, further comprising validating the received user input prior to said modifying the preference values.

5. The method as recited in claim 1, wherein said configuring preference values for one or more pluggable components on a first device comprises:
receiving user input to a command line interface of the first device; and
modifying the preference values of a first of the one or more pluggable components in accordance with the received user input.

6. The method as recited in claim 5, wherein the received user input specifies one or more of the preference values of the first pluggable component and a new value for each of the specified preference values.

7. The method as recited in claim 5, further comprising validating the received user input prior to said modifying the preference values.

8. The method as recited in claim 1, wherein said configuring preference values of one or more pluggable components on a first device comprises modifying one or more of the preference values of at least one of the one or more pluggable components.

9. The method as recited in claim 1, further comprising initializing each of the preference values of each of the one or more pluggable components to a default value for the preference value prior to said configuring.

10. The method as recited in claim 1, wherein the one or more pluggable components is a plurality of pluggable components, wherein each of the plurality of pluggable components are copies of a first pluggable component.

11. The method as recited in claim 10, wherein the one or more other devices is a plurality of devices, wherein said configuring preference values comprises modifying the preference values for each of the plurality of pluggable components for execution within a corresponding one of the plurality of devices.

12. The method as recited in claim 11, wherein said distributing comprises sending each of the plurality of pluggable components to the corresponding one of the plurality of devices via the network.

13. The method as recited in claim 1, wherein said configuring preference values for one or more pluggable components on a first device comprises:
generating a batch file comprising one or more configuration entries for the one or more pluggable components, wherein each configuration entry includes:
information specifying one of the one or more pluggable components;
information specifying one of the preference values for the specified pluggable component; and
a new value for the specified preference value; and
executing the batch file on the first device;
wherein said executing the batch file comprises executing each of the one or more configuration entries in the batch file, wherein each of the one or more configuration entries sets the specified preference value for the specified pluggable component to the new value of the configuration entry when executed.

14. The method as recited in claim 13,
wherein the batch file further comprises one or more distribution entries, wherein each distribution entry includes:
information specifying one of the one or more pluggable components; and
information specifying one of the one or more other devices as a destination device for the specified pluggable component;
wherein said executing the batch file comprises executing each of the one or more distribution entries in the batch file; and
wherein said executing each of the one or more distribution entries comprises sending the specified pluggable component to the specified destination device via the network.

15. The method as recited in claim 1, wherein each of the one or more pluggable components comprises a preferences file comprising the preference values associated with the pluggable component.

16. The method as recited in claim 15, wherein the preferences files are Java programming language Properties files.

17. The method as recited in claim 1, wherein each of the one or more other devices comprise an embedded server, wherein the one or more pluggable components are executable within the embedded server of each of the one or more other devices.

18. The method as recited in claim 16, wherein the embedded servers include Java Embedded Servers.

19. The method as recited in claim 1, wherein the pluggable components are Java Archive (JAR) files.

20. The method as recited in claim 1, wherein the network is the Internet.

21. A system comprising:
a first device; and
a plurality of devices operable to couple to the first device via a network;
wherein the first device is configured to:
configure preference values for a plurality of pluggable components in accordance with user input; and
distribute the plurality of pluggable components to the plurality of devices via the network subsequent to said configuring and in response to user input; and
wherein the plurality of pluggable components are executable within the plurality of devices in accordance with the configured preference values to provide services to users of the plurality of devices.

22. The system as recited in claim 21, wherein the first device comprises a display component, wherein, in said configuring preference values for a plurality of pluggable components, the first device is further configured to:
  display in a graphical user interface on the display component a current value of each of the preference values of a first of the plurality of pluggable components;
  receive user input to the graphical user interface changing one or more of the displayed current values; and
  modify the preference values of the first pluggable component in accordance with the received user input.

23. The system as recited in claim 21, wherein the first device further comprises a display component, wherein, in said configuring preference values for a plurality of pluggable components, the first device is further configured to:
  receive user input to a command line interface on the display component of the device, wherein the user input specifies one or more of the preference values of the first pluggable component and a new value for each of the specified preference values; and
  modify the preference values of a first of the plurality of pluggable components in accordance with the received user input.

24. The system as recited in claim 21, wherein the processor is further operable to initialize each of the preference values of each of the plurality of pluggable components to a default value for the preference value prior to said configuring, and wherein, in said configuring preference values of the plurality of pluggable components, the first device is further configured to modify one or more of the default preference values of at least one of the plurality of pluggable components.

25. The system as recited in claim 21, wherein each of the plurality of pluggable components are copies of a first pluggable component, wherein, in said configuring preference values, the first device is further configured to customize the preference values for each of the plurality of pluggable components for execution within a corresponding one of the plurality of devices.

26. The system as recited in claim 25, wherein, in said distributing, the first device is further configured to send each of the plurality of pluggable components to the corresponding one of the plurality of devices via the network.

27. The system as recited in claim 21, wherein, in said configuring preference values for a plurality of pluggable components, the first device is further configured to:
  generate a batch file comprising one or more configuration entries for the plurality of pluggable components in response to user input, wherein each configuration entry includes:
    information specifying one of the plurality of pluggable components;
    information specifying one of the preference values for the specified pluggable component; and
    a new value for the specified preference value; and
  execute the batch file;
  wherein, in said executing the batch file, the first device is further configured to execute each of the one or more configuration entries in the batch file, wherein each of the one or more configuration entries sets the specified preference value for the specified pluggable component to the new value of the configuration entry when executed.

28. The system as recited in claim 27,
  wherein the batch file further comprises one or more distribution entries, wherein each distribution entry includes:
    information specifying one of the plurality of pluggable components; and
    information specifying one of the plurality of devices as a destination device for the specified pluggable component;
  wherein, in said executing the batch file, the first device is further configured to execute each of the one or more distribution entries in the batch file; and
  wherein, in said executing each of the one or more distribution entries, the first device is further configured to send the specified pluggable component to the specified destination device via the network.

29. The system as recited in claim 21, wherein each of the plurality of pluggable components comprises a preferences file comprising the preference values associated with the pluggable component.

30. The system as recited in claim 21, wherein the preferences files are Java programming language Properties files.

31. The system as recited in claim 21, wherein each of the plurality of devices comprise an embedded server, wherein the plurality of pluggable components are executable within the embedded servers of the plurality of devices.

32. The system as recited in claim 31, wherein the embedded servers include Java Embedded Servers.

33. The system as recited in claim 21, wherein the pluggable components are Java Archive (JAR) files.

34. The system as recited in claim 21, wherein the network is the Internet.

35. A device comprising:
  a memory configured to store program instructions;
  an input device configured to receive user input; and
  a processor configured to read the program instructions from the memory and to execute the program instructions, wherein, in response to execution of the program instructions, the processor is operable to:
    configure preference values for one or more pluggable components on the device in accordance with received user input; and
    distribute the one or more pluggable components to one or more other devices via a network subsequent to said configuring and in response to user input;
  wherein the one or more pluggable components are executable within the one or more other devices in accordance with the configured preference values to provide services to users of the one or more other devices.

36. The device as recited in claim 35, further comprising:
  a display component;
  wherein, in said configuring preference values for one or more pluggable components, the processor is further operable to:
    display in a graphical user interface on the display component a current value of each of the preference values of a first of the one or more pluggable components;
    receive user input to the graphical user interface changing one or more of the displayed current values; and
    modify the preference values of the first pluggable component in accordance with the received user input.

37. The device as recited in claim 35, further comprising:
  a display component;
  wherein, in said configuring preference values for one or more pluggable components, the processor is further operable to:
    receive user input to a command line interface on the display component of the device, wherein the received user input specifies one or more of the preference values of the first pluggable component and a new value for each of the specified preference values; and modify the preference values of a first of the one or more pluggable components in accordance with the received user input.

38. The device as recited in claim 35, wherein the processor is further operable to initialize each of the preference values of each of the one or more pluggable components to a default value for the preference value prior to said configuring.

39. The device as recited in claim 35, wherein the one or more pluggable components is a plurality of pluggable components, wherein each of the plurality of pluggable components are copies of a first pluggable component, wherein the one or more other devices is a plurality of devices, wherein, in said configuring preference values, the processor is further operable to modify the preference values for each of the plurality of pluggable components for execution within a corresponding one of the plurality of devices.

40. The device as recited in claim 39, wherein, in said distributing, the processor is further operable to send each of the plurality of pluggable components to the corresponding one of the plurality of devices via the network.

41. The device as recited in claim 35, wherein, in said configuring preference values for one or more pluggable components on a first device, the processor is further operable to:
generate a batch file comprising one or more configuration entries for the one or more pluggable components in response to user input, wherein each configuration entry includes:
information specifying one of the one or more pluggable components;
information specifying one of the preference values for the specified pluggable component; and
a new value for the specified preference value; and
execute the batch file;
wherein, in said executing the batch file, the processor is further operable to execute each of the one or more configuration entries in the batch file, wherein each of the one or more configuration entries sets the specified preference value for the specified pluggable component to the new value of the configuration entry when executed.

42. The device as recited in claim 35, wherein each of the one or more pluggable components comprises a preferences file comprising the preference values associated with the pluggable component.

43. The device as recited in claim 35, wherein the pluggable components are Java Archive (JAR) files.

44. The device as recited in claim 35, wherein the network is the Internet.

45. A carrier medium comprising program instructions, wherein the program instructions are computer-executable to implement:
configuring preference values for one or more pluggable components; and
distributing the one or more pluggable components to one or more devices via a network subsequent to said configuring;
wherein the one or more pluggable components are executable within the one or more devices in accordance with the configured preference values to provide services to users of the one or more devices.

46. The carrier medium as recited in claim 45, wherein, in said configuring preference values for one or more pluggable components, the program instructions are further computer-executable to implement:
displaying on a graphical user interface a current value of each of the preference values of a first of the one or more pluggable components;
receiving user input to the graphical user interface, wherein the received user input changes one or more of the displayed current values; and
modifying the preference values of the first pluggable component in accordance with the received user input.

47. The carrier medium as recited in claim 45, wherein, in said configuring preference values for one or more pluggable components, the program instructions are further computer-executable to implement:
receiving user input to a command line interface, wherein the received user input specifies one or more of the preference values of a first of the one or more pluggable components and a new value for each of the specified preference values; and
modifying the preference values of the first pluggable component in accordance with the received user input.

48. The carrier medium as recited in claim 45, wherein the program instructions are further computer-executable to implement initializing each of the preference values of each of the one or more pluggable components to a default value for the preference value prior to said configuring.

49. The carrier medium as recited in claim 45, wherein the one or more pluggable components is a plurality of pluggable components, wherein each of the plurality of pluggable components are copies of a first pluggable component, wherein the one or more devices is a plurality of devices, wherein, in said configuring preference values, the program instructions are further computer-executable to implement modifying the preference values for each of the plurality of pluggable components for execution within a corresponding one of the plurality of devices.

50. The carrier medium as recited in claim 49, wherein, in said distributing, the program instructions are further computer-executable to implement sending each of the plurality of pluggable components to the corresponding one of the plurality of devices via the network.

51. The carrier medium as recited in claim 45, wherein, in said configuring preference values for one or more pluggable components, the program instructions are further computer-executable to implement:
generating a batch file comprising one or more configuration entries for the one or more pluggable components, wherein each configuration entry includes:
information specifying one of the one or more pluggable components;
information specifying one of the preference values for the specified pluggable component; and
a new value for the specified preference value; and
executing each of the one or more configuration entries in the batch file, wherein each of the one or more configuration entries sets the specified preference value for the specified pluggable component to the new value of the configuration entry when executed.

52. The carrier medium as recited in claim 45, wherein each of the one or more devices comprise an embedded server, wherein the one or more pluggable components are executable within the embedded server of each of the one or more devices.

53. The carrier medium as recited in claim 52, wherein the pluggable components are Java Archive (JAR) files.

54. The carrier medium as recited in claim 45, wherein the network is the Internet.

* * * * *